United States Patent

Miller, III et al.

[11] Patent Number: 5,782,529
[45] Date of Patent: Jul. 21, 1998

[54] INFLATABLE SEAT BACK

[75] Inventors: H. John Miller, III, Hillside; Gerald Keller, Blue Bell, both of Mich.

[73] Assignee: AlliedSignal Inc., Morristown, N.J.

[21] Appl. No.: 803,563

[22] Filed: Feb. 20, 1997

[51] Int. Cl.$^6$ .................................................. B60R 21/22
[52] U.S. Cl. .......................... 297/216.13; 297/216.12; 280/730.1
[58] Field of Search ................. 297/216.1, 216.12, 297/216.13, 216.14, 284.6, 452.41; 280/730.1, 730.2

[56] References Cited

U.S. PATENT DOCUMENTS

| | | | |
|---|---|---|---|
| 1,976,320 | 10/1934 | Austin | 297/452.41 X |
| 3,698,670 | 10/1972 | Ewing | 297/216.13 X |
| 3,779,577 | 12/1973 | Wilfert | 280/730.1 |
| 4,514,010 | 4/1985 | Gonzalez | 297/452.41 X |
| 5,562,324 | 10/1996 | Massara et al. | 297/452.41 X |

FOREIGN PATENT DOCUMENTS 2841729  4/1980  Germany ............................ 280/730 R

*Primary Examiner*—Peter R. Brown
*Attorney, Agent, or Firm*—Markell Seitzman

[57] ABSTRACT

An occupant protection system for protecting a seated occupant comprising: seat (20) having a seat cushion (22) and a seat back (24), frame means (26, 30) to support the seat back, a headrest extending above the seat back, cushion material (32) for providing resiliency to the seat and a protective cover material (34) covering the cushion material; an air bag (50,50'), having a first portion extending generally along the length of the seat back and a second portion which when inflated extends above the seat back to be positioned generally in front of the headrest, whereby upon inflation of the first portion of the air bag a portion of the seat back is gently urged against the spine of the occupant and the second portion expands upwardly to provide a protective layer between the headrest and the occupant's head.

15 Claims, 6 Drawing Sheets

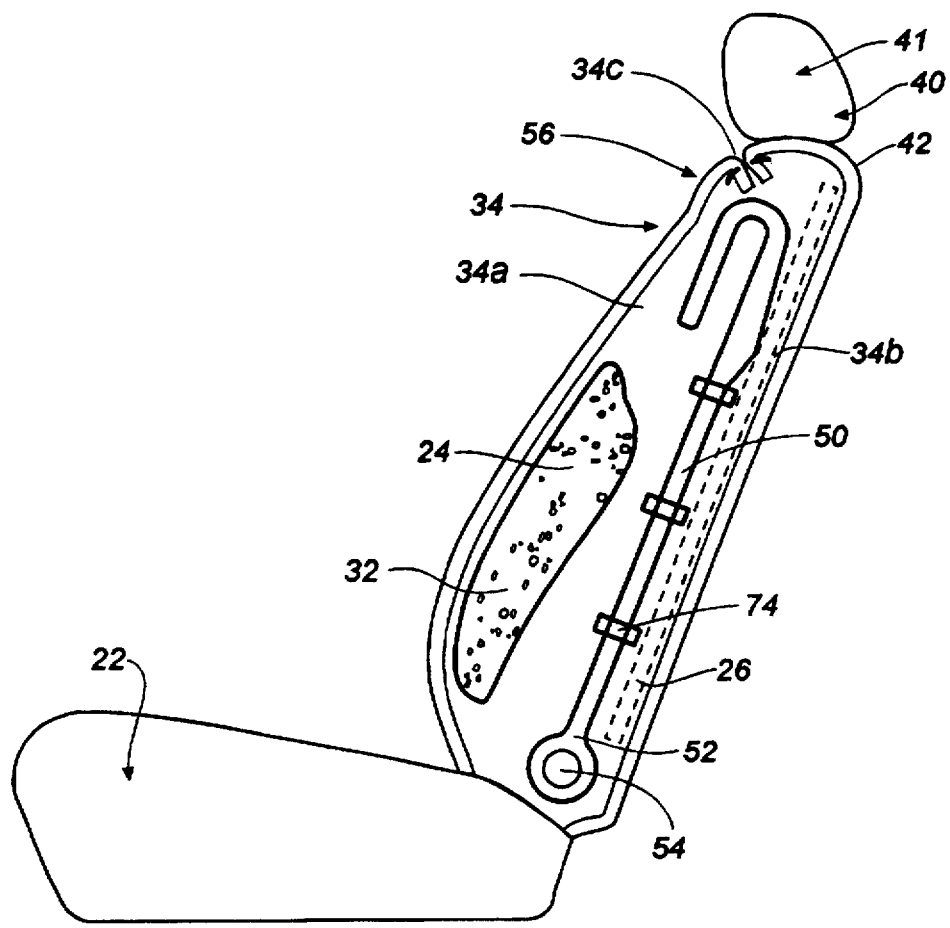
FIG. - 2
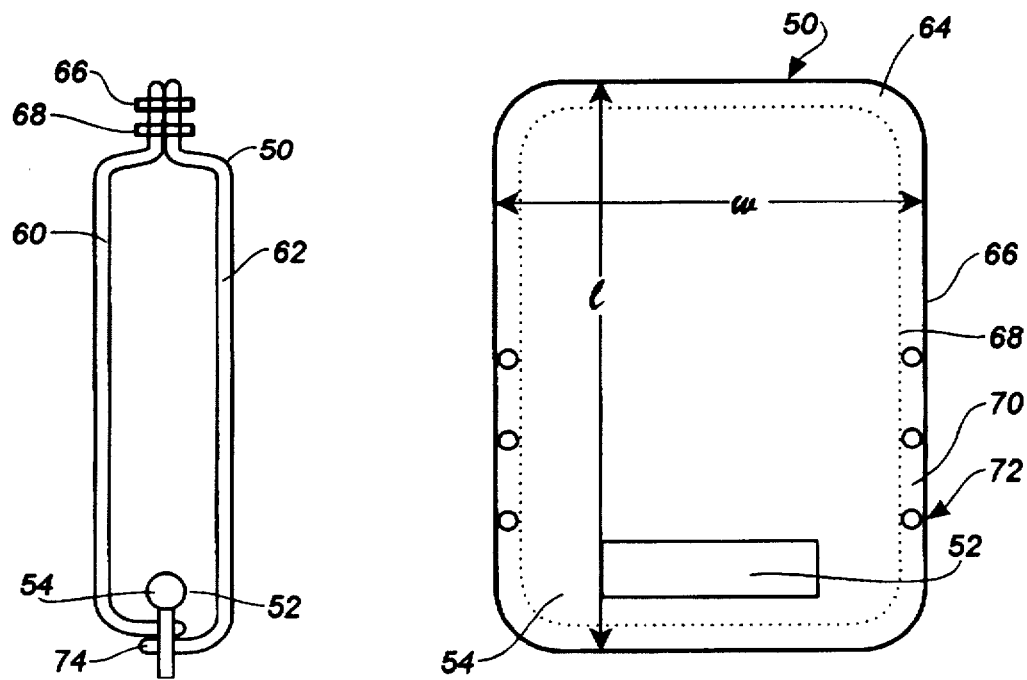
FIG. - 4  FIG. - 3

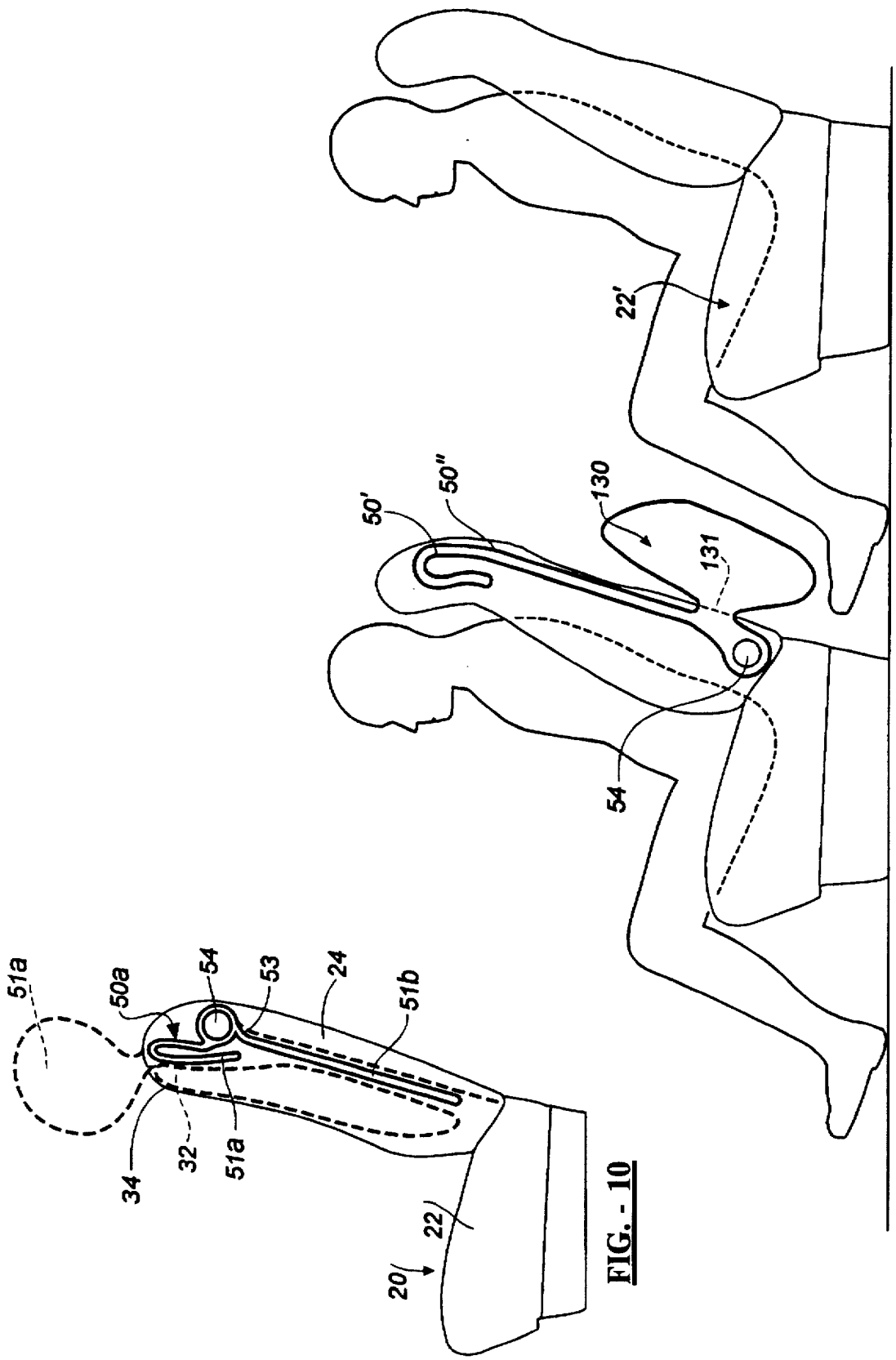

INFLATABLE SEAT BACK

BACKGROUND AND SUMMARY OF THE INVENTION

The present invention generally relates to air bag devices for motor vehicles and more particularly to an air bag and system for protecting the spine and head of an occupant during a crash.

Spinal or soft tissue (spinal fractures and whiplash) often result in automotive rear impact accidents. In a rear impact event, the occupant translates both rearward into the seat back surface, as well as upward along the seat back surface. The thoracic and cervical sections of the spine become abnormally straightened and compressed due to the torso mass accelerating upward and the head's inertia resisting the vertical acceleration. When the spine is straightened, the body's skeletal mechanical injury resistance is reduced due to the induced slack in the ligaments between the spinal vertebrae. This situation is particularly hazardous because of improper placement of the headrest and physical offset between the occupant and seat back/headrest which allows occupant acceleration relative to the vehicle during the accident. The occupant acceleration into a non-supporting seat back and headrest creates shear loading on the thoracic spine and hyperextension of the cervical spine that typically causes soft tissue injuries (whiplash) and possibly injuries to the spine itself in certain situations. Additionally, research indicates that when the spine undergoes severe bending (hyperextension) muscle spasms can occur aggravating existing injuries.

In summary, automotive rear impact cervical spine injuries occur because of occupant misalignment with supporting surfaces and the shearing load imparted from the acceleration relative to the vehicle. Whiplash and possibly spinal injuries to the spinal cord or vertebrae can occur. The shear loading imparted from a rear impact is more likely to cause costly soft tissue injuries than loading in frontal or side impacts.

It is an object of the present invention to provide an improved air bag restraint system to protect the occupant from spinal and soft tissue damage.

Accordingly the invention comprises an occupant protection system including a seat having a seat cushion and a seat back, frame means to support the back cushion, an optional headrest extending above the seat back, cushion material for providing resiliency to the seat and a protective cover material covering the cushion material; an air bag having a first portion extending generally along the length of the seat back and a second portion which when inflated extends above the seat back to be positioned generally in front of the headrest. Upon inflation of the air bag the first portion inflates to urge portions of the seat back to gently expand against the spine of a seated occupant and the second portion expands through the top of the seat back providing a protective layer between the occupant's head and the headrest. The air bag also compensates for a headrest that is misaligned relative to the occupant's head by providing a much larger reaction surface for the head. The air bag further cushions head travel and takes up space between head and headrest to prevent high head velocities.

Many other objects and purposes of the invention will be clear from the following detailed description of the drawings.

BRIEF DESCRIPTION OF THE DRAWINGS

In the drawings:

FIG. 2 illustrates a cross-sectional view of the vehicle seat incorporating the present invention.

FIG. 3 and 4 illustrate various views of an air bag.

FIG. 9 illustrates an alternate embodiment of the present invention

FIG. 10 illustrates an additional embodiment of the invention.

DETAILED DESCRIPTION OF THE DRAWINGS

Figure 1:
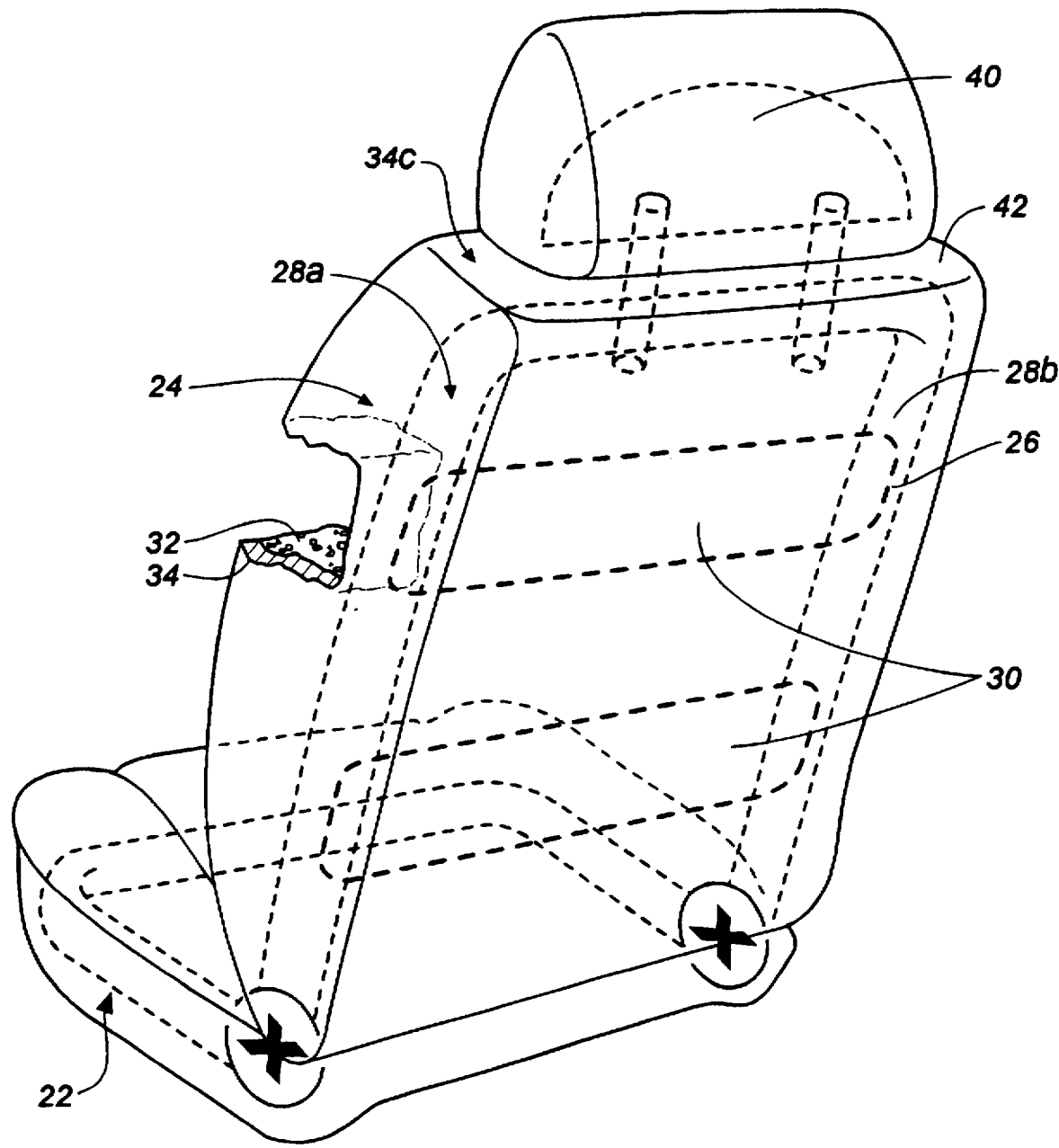
FIG. 1 is an isometric view of a typical prior art automotive vehicle seat.

Reference if briefly made to FIG. 1 which illustrates the typical construction of an automotive vehicle seat generally shown as 20. The seat includes a seat cushion 22 and seat back 24. Both the seat cushion and seat back are constructed using an underlying support frame covered by a foam 32 and an outer layer of protective or decorative material 34 such as woven cloth or leather. With regard to the seat back 24, a support frame 26 is shown having vertical posts 28a and 28b. Interconnecting the posts 28a,b are a plurality of horizontal supports or springs which provide support for the foam 32 and covering material 34. The seat back and seat cushion may be of integral construction or hinged relative one to the other as is typically the case with two-door vehicles. The typical automotive seat further includes a headrest 40 which is appropriately secured to a frame part. The headrest may be movable relative to the back 24 or an integral part thereof.

Figure 5:
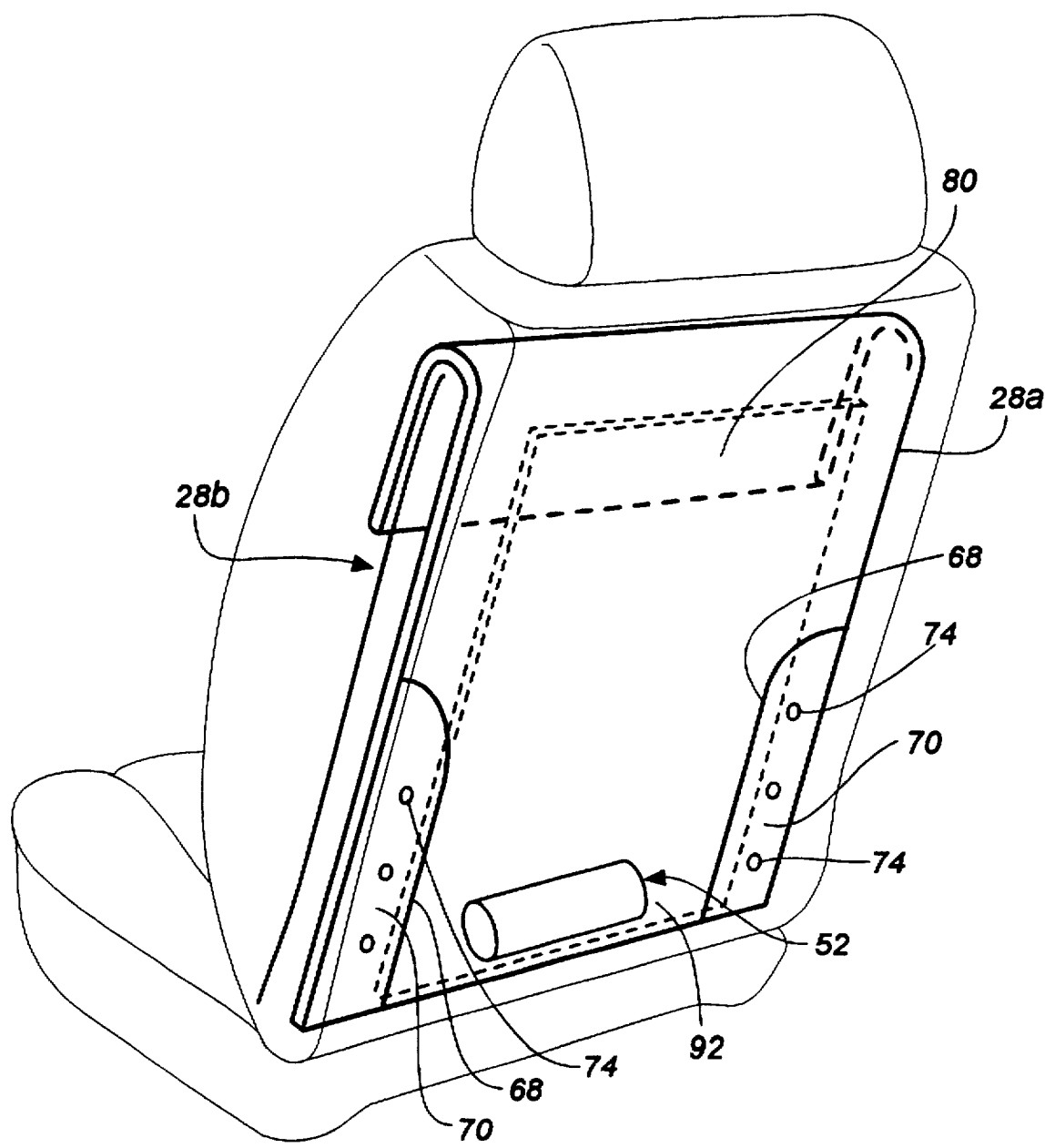
FIG. 5 shows the air bag of the present invention secured to a seat frame.

Reference is now made to FIG. 2 which illustrates a cross-sectional view of the automotive seat 20 incorporating the present invention. FIG. 2 diagrammatically illustrates the construction of the seat covering material 34. Seat covering material 34 may include a front piece 34a and a rear piece 34b that are sewn together at a seam 34c that extends horizontally across the top 42 of the seat back 24. Situated between the foam 32 of the back 24 and the frame 26, which is shown in phantom line, is an air bag 50. The lower portion 52 of the air bag is operatively connected to an air bag inflator 54 of known construction In the embodiment illustrated in FIG. 2 the top portion generally shown as 56 of the air bag 50 is folded over or tucked into itself so that it fits within the contour of the seat. The purpose of this construction will be apparent from the description below. Reference is now made to FIGS. 3 and 4 which show various views of the air bag 50. The air bag is made of front 60 and rear 62 panels of material. As can be seen in FIG. 3, these panels are generally rectangularly shaped. The width (w) of the uninflated air bag is substantially equal to the spacing between the seat frame posts 28a and 28b while the length (1) of the air bag is sufficiently long such that, when inflated, the air bag will extend from the mounting location of the inflator 54 with its top 56 portion extending significantly above the top 41 of the headrest. The panels 60 and 62 of the air bag 50 are joined at an exterior peripheral seam 66 (shown in solid line) and further secured by an interior seam 68. As can be seen, the space between the seam 66 and 68 defines a border 70. Positioned at points along the border 70 are a plurality of openings 72 which are received about and secured to studs 74 extending from both frame posts 28a and 28b. Reference is briefly made to FIG. 5 which illustrates the air bag secured to the posts 28a and 28b with the top portion 64 of the air bag folded over generally at 80 so that it fits within the confines of the seat back 24.

In FIGS. 2 and 5 the air bag inflator 54 is situated within the lower extreme 92 of the air bag. The method of retaining the inflator 54 to the air bag is not part of the present invention and many such methodologies can be used. As illustrated in FIG. 4, the inflator 54 includes a plurality of extending studs 92 which are received within openings in flaps formed at the lower end 92 of the air bag. The studs 92 are similarly received within openings in a lower frame portion securing the air bag to the frame 26 and appropriately secured by fasteners or the like.

Figure 6:
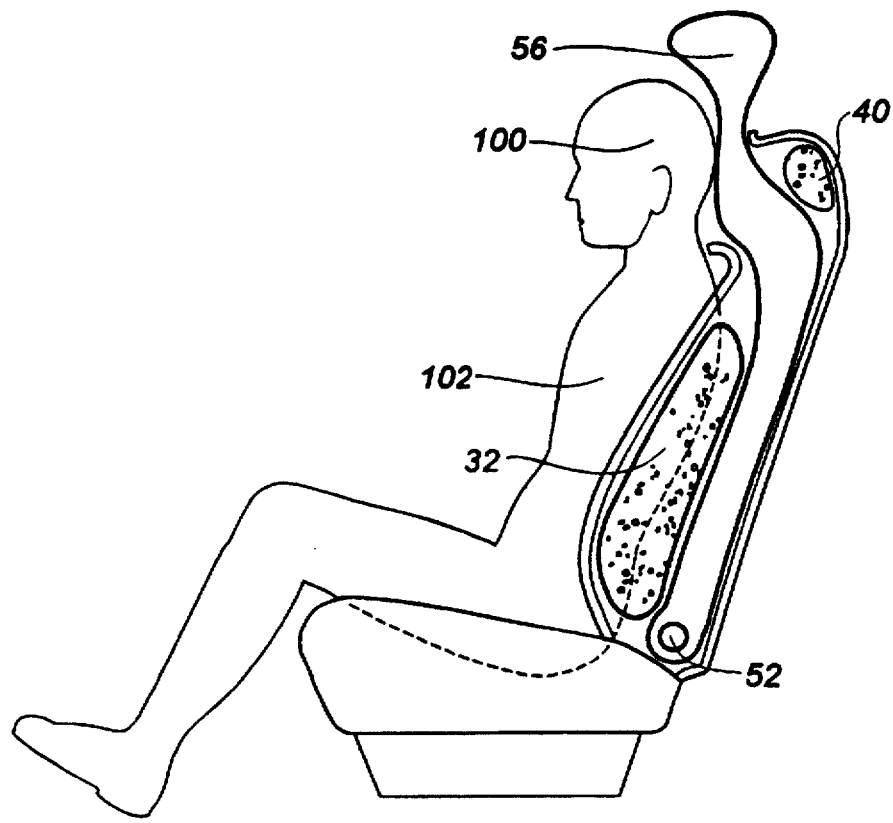
FIG. 6 illustrates a side view of a seat back showing an air bag after it has been inflated.

Reference is briefly made to FIG. 6 which illustrates the operation of the present invention. FIG. 6 also shows a headrest integrated in the seat back 24. After the initiation of a crash event which is sensed by an appropriate and known crash sensor, the inflator 54 is activated to provide inflation gas to the interior of the air bag 50. The air bag 50 will subsequently inflate and tear through the top 42 of the seat, typically separating the seam 34c joining the various covering material pieces 34 and 34b together The top 64 of the air bag when inflated will be positioned between the headrest 40 and the head 100 of the occupant. Further, as the air bag inflates it will urge the foam 32 towards the back 102 of the occupant, protecting the occupant's spine from injury.

Figure 7:
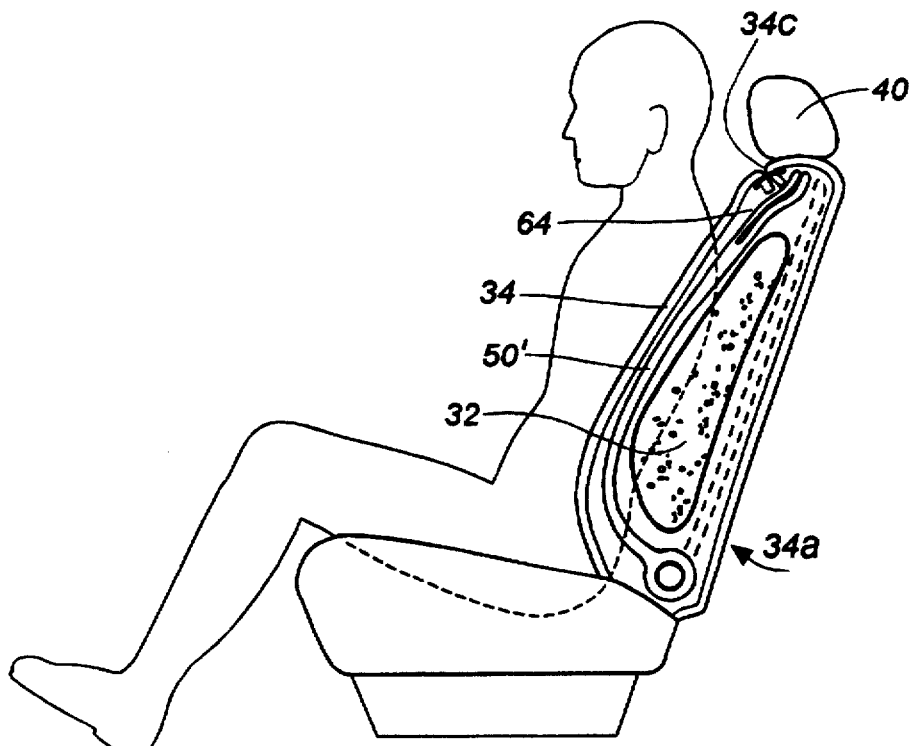
FIG. 7 illustrates an alternate embodiment of the present invention.

Reference is briefly made to FIG. 7 which illustrates an alternate embodiment of the present invention. In this embodiment the air bag 50' is located between the front material covering 34 and the foam support material 32. As can be appreciated, in this embodiment of the invention the air bag 50' is loosely positioned between the material 34 and the cushion, or alternatively, adhesively attached to the cushion. The top portion of the air bag 64 is positioned such that it envelops the top of the foam material 32. Upon activation of the inflator the air bag breaks through the seam 34c and provides a cushion between the head of the occupant and the headrest. Similarly, the inflated air bag 54 expands to fill the spaces between the seat back and the occupant's spine. It should be appreciated that even if the seat back 24 did not include or support a headrest such as 40 the expanding air bag 50 or 50' would act as one protecting against neck injuries.

Figure 8:
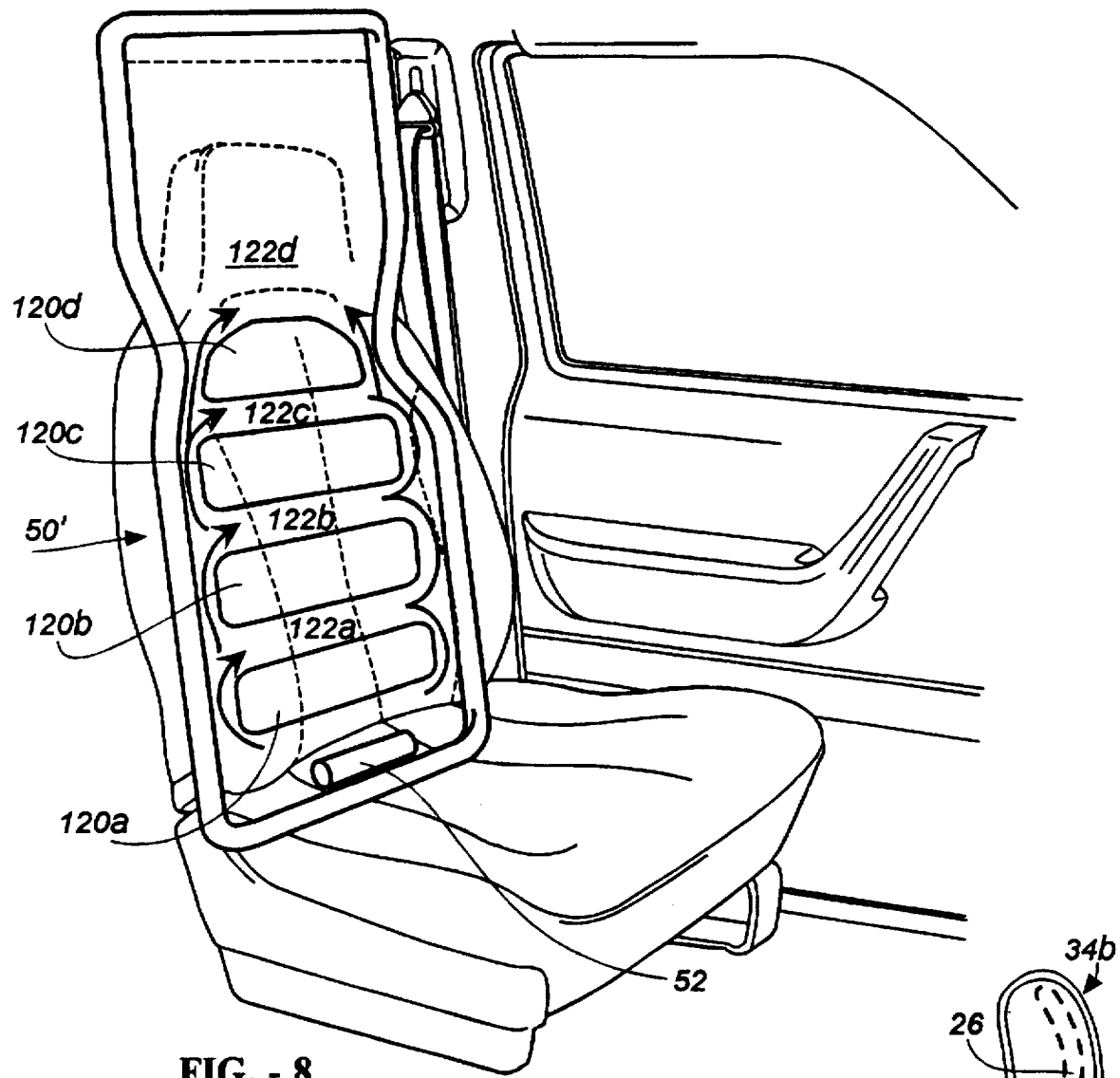
FIG. 8 illustrates a further embodiment of the present invention.

Reference is made to FIG. 8 which illustrates a further embodiment of the present invention. The air bag 50' shown therein is manufactured of the two panels 60 and 62 and sewn together by one or more seams such as 66 and 68. In this embodiment, various portions of the air bag are sewn together by intermediate sew stitch patterns 120a–120d, defining flow passages or discrete inflation chambers 122a–122d. These chambers can be strategically positioned along the seat back to protect the lower lumbar and upper regions of the spine as well as the head of the occupant.

Reference is made to FIG. 9 which illustrates an alternate embodiment of the invention. As is apparent from the present invention, a preferred mounting location for the inflator 54 is at the lower extreme of the seat back 24. FIG. 9 illustrates a further embodiment of the present invention in which an air bag 50" is constructed to have two chambers or portions. The first chamber would correspond to air bag 50 or 50' and positioned as described above. The second portion 130 is folded (prior to inflation, the fold contour shown as 131) about the inflator and positioned to face rearwardly, generally facing the rear seat 22' of the vehicle. Upon activation of the inflator 54, the air bag 50" is activated to inflate its spinal, lumbar and head support portion 50, as well as the second portion 130. As can be seen, the second portion 130 inflates rearwardly toward the rear seat 22' to provide a knee bolster for the rear seated occupant. FIG. 10 illustrates another embodiment of the invention in which the inflator 54 is mounted at a higher location in the seat such as upon the top frame 26. The inflator 54 is positioned within air bag 50a which has an upper chamber 51a and a lower chamber 51b. As can be seen the inflator 54 is disposed just below the upper chamber 51a. By positioning the inflator adjacent the upper chamber permits the upper chamber to inflate rapidly to break through the seam 34c to provide protection for the occupant's head. In the illustrated embodiment the seat 20 does not include a head rest, however the inflated upper chamber (shown in phantom line) will support the head reducing whiplash injury. The lower chamber 51b, when inflated will urge the cushion 32 and/or the covering material 34 against the occupant's back. Because of the upper chamber's proximity to the inflator 54 it will inflate prior to the lower chamber 51b. If desired the inflation of the lower chamber 51b can be further delayed relative to the inflation of the upper chamber 51a by including between the two chambers a flow valve 53 therebetween. This flow valve can be fashioned by providing a sewn restriction between the upper and lower chambers or by inserting a separate flow restricting orifice.

Figure 11:
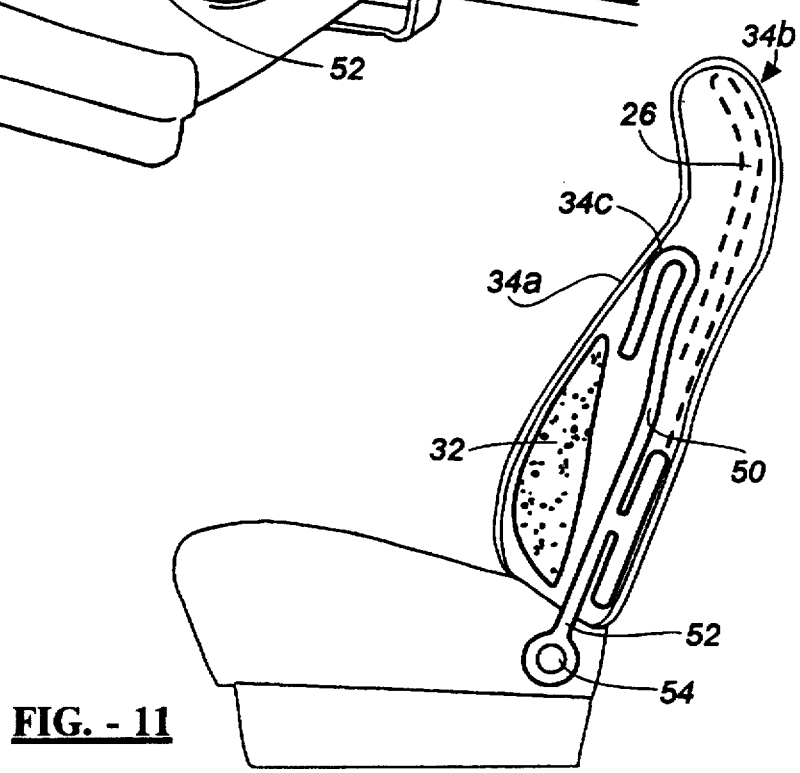
FIG. 11 illustrates a final embodiment of the invention.

Reference is briefly made to FIG. 11 which shows an alternate location of the inflator 54. In this embodiment, the inflator is located within the seat cushion 22 rather than in the seat back. The air bag, generally shown as 50, may be any of the air bag described above including single or multi-chambered airbags including those which provide a knee bolster for the rear occupant. To encourage the earlier inflation of the back and head portion of the air bag prior to the inflation of the knee bolster portion a flow restricting valve 53 may be inserted upstream of the knee bolster portion.

Many changes and modifications in the above described embodiment of the invention can, of course, be carried out without departing from the scope thereof. Accordingly, that scope is intended to be limited only by the scope of the appended claims.

We claim:

1. An occupant protection system for protecting a seated occupant comprising:

a seat (20) having a seat cushion (22) and a seat back (24), the seat back including a back support surface; frame means (26, 30) to support the seat back, an integral or moveable headrest extending above the seat back, cushion material (32) for providing resiliency to the seat and a protective cover material (34) covering cushion material;

an air bag system including an air bag and means for inflating said bag in response to a vehicle collision, the air bag having an inflatable first portion positioned within the seat generally behind the back support surface, wherein upon inflation of the first portion of the air bag, during the collision, a portion of the back support surface is adapted to be gently urged against the spine of the occupant supported by the inflated first portion.

2. The device as defined in claim 1 wherein the air bag includes a second portion which when inflated extends above the seat back positioned generally in front of the headrest to provide a protective layer between the headrest and the occupant's head.

3. The device as defined in claim 1 wherein the air bag is positioned between the cushion material and the frame means.

4. The device as defined in claim 1 wherein the first portion of the air bag is fixedly secured to the frame means.

5. The device as defined in claim 1 wherein the air bag is positioned between the covering material and the cushion material.

6. The device as defined in claim 1 wherein the air bag includes another portion which upon inflation provides an inflated knee bolster for a passenger in a seat positioned behind the seat.

7. The system as defined in claim 1 wherein the first means includes an air bag inflator.

8. The device as defined in claim 7 wherein the inflator is positioned within the air bag.

9. The device as defined in claim 7 wherein the inflator is positioned proximate the upper extreme of the back cushion.

10. The device as defined in claim 9 wherein the air bag extends from the location of the inflator both upwardly and downwardly through the back cushion.

11. The device as defined in claim 7 wherein the inflator is positioned proximate the seat back frame means in the seat cushion of the automotive seat.

12. The device as defined in claim 1 wherein the means for inflating includes an air bag inflator that is positioned proximate a lower extreme of the seat back.

13. The device as defined in claim 1 wherein the means for inflating includes an air bag inflator and wherein the air bag extends from the location of the inflator upwardly through the seat back.

14. An occupant protection system for protecting a seated occupant comprising:

a seat (20) having a seat cushion (22) and a seat back (24) the seat back including a back support surface; frame means (26, 30) to support the seat back, cushion material (32) for providing resiliency to the seat and a protective cover material (34) covering cushion material, wherein the material covering the seat back, generally near its top, includes a frangible portion opened by a portion of an inflating air bag;

an air bag system including an air bag and means for inflating said air bag in response to a vehicle collision, the air bag having an inflatable first portion and an inflatable second portion, the first portion positioned within the seat generally behind the back support surface, wherein upon inflation of the first portion of the air bag, during the collision, a portion of the back support surface is gently urged against the spine of the occupant supported by the inflated first portion, the second portion when inflated opens the frangible portion of the seat back and inflates therethough to be positioned generally above the seat back to provide protection for the occupant's head.

15. The device as defined in claim 14 wherein the seat includes a headrest and wherein upon inflation, the second portion is positioned generally in front of the headrest to provide a protective layer between the headrest and the occupant's head.

* * * * *